J. L. ERWIN.
COTTON CHOPPER AND CULTIVATOR.
APPLICATION FILED AUG. 29, 1910.
990,480.
Patented Apr. 25, 1911.
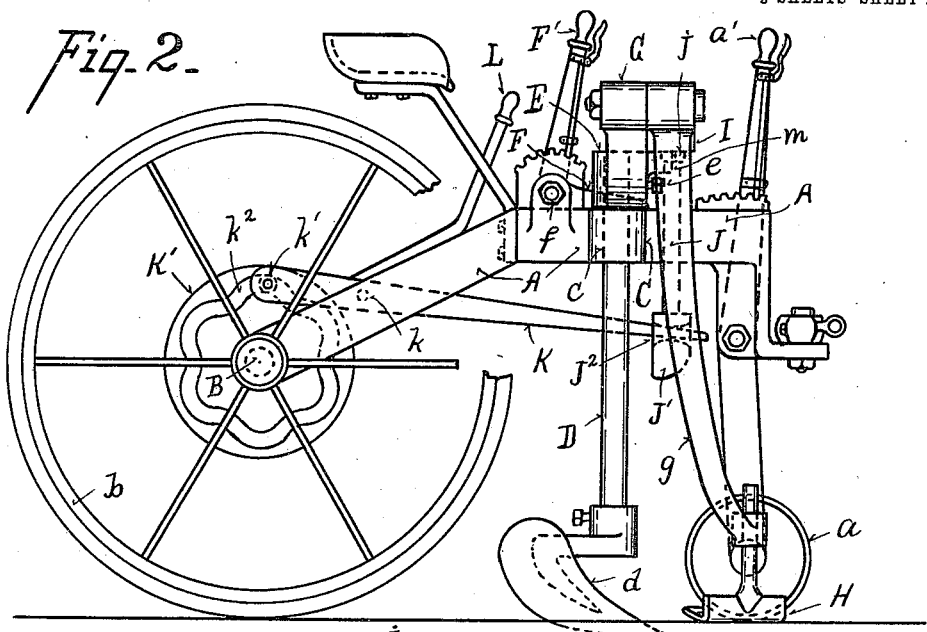
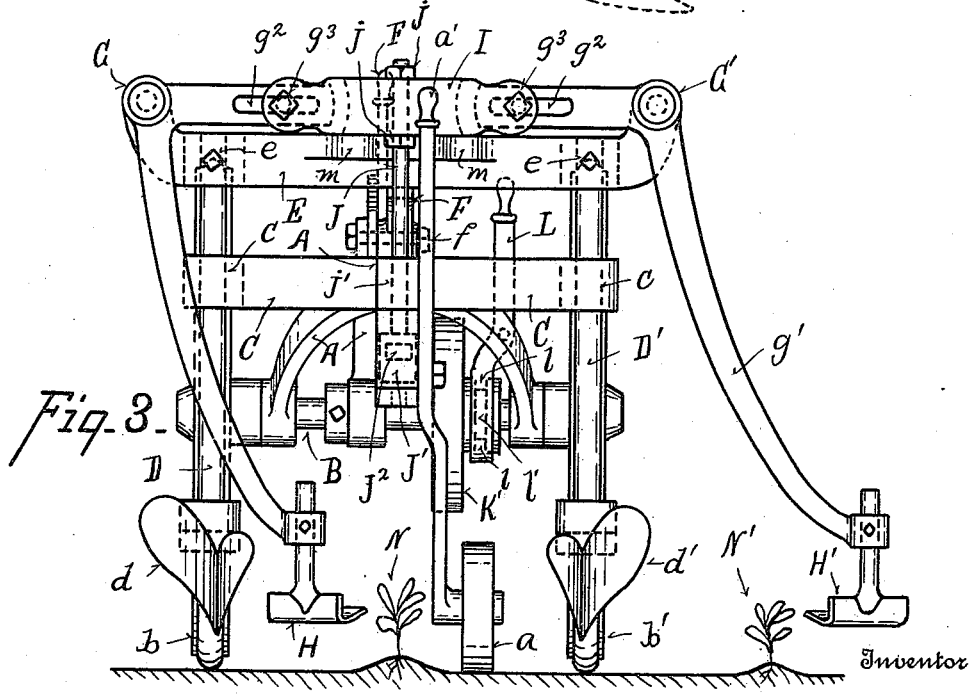
Witnesses
Walter T. Murray
Alla Mae Simpson
Inventor
James L. Erwin
By C. W. Miles.
Attorney

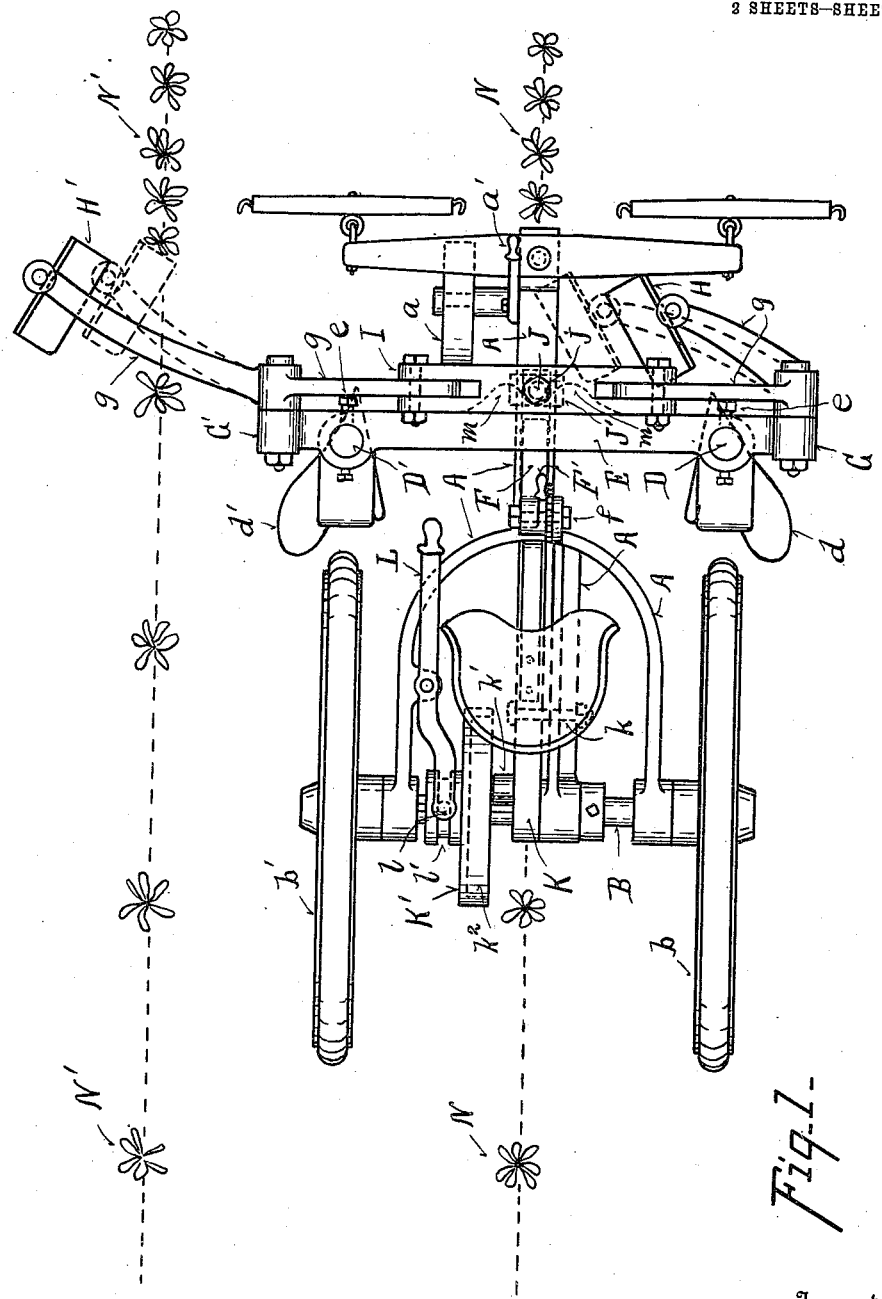

UNITED STATES PATENT OFFICE.

JAMES L. ERWIN, OF GREENSBORO, NORTH CAROLINA, ASSIGNOR OF ONE-THIRD TO STEPHEN S. MILES AND ONE-THIRD TO J. F. JORDEN, BOTH OF GREENSBORO, NORTH CAROLINA.

COTTON CHOPPER AND CULTIVATOR.

990,480. Specification of Letters Patent. Patented Apr. 25, 1911.

Application filed August 29, 1910. Serial No. 579,537.

*To all whom it may concern:*

Be it known that I, JAMES L. ERWIN, a citizen of the United States, residing at Greensboro, in the county of Guilford and State of North Carolina, have invented certain new and useful Improvements in Cotton Choppers and Cultivators, of which the following is a specification.

My invention relates to improvements in agricultural implements, and is particularly adapted to the cultivation of cotton. One of its objects is to provide a cultivator adapted to cultivate the ground between the rows of plants and to also cut the surplus plants from the rows.

Another object is to provide means for shifting the plant cutting mechanism into and out of operation.

Another object is to provide improved means to control the depth of cultivation and to shift the cultivating and plant cutting mechanism into and out of operative position.

It further consists in certain details of form, combination and arrangement, all of which will be more fully described in connection with the accompanying drawings, in which;

Figure 1 is a top plan view of my improved mechanism in position for use. Fig. 2 is a side elevation of the same, Fig. 3 is a front elevation of the same.

In the accompanying drawings A represents the frame of the machine, which is supported in rear upon a revolving axle B carried by wheels $b$ $b'$. The frame A may if desired be supported at the forward end by a tongue, but is preferably supported by a pilot wheel $a$, which is adjustable by means of a hand lever $a'$ to support the forward end of the frame at the desired height. The frame A has cross-arms, or side arms C C' provided at their free ends with sockets or eyes $c$ through which are passed vertically adjustable cultivator bars D D'. To the lower ends of the bars D D' are attached plows or cultivators $d$ $d'$, it being designed to employ interchangeably a variety of plows or cultivators of different shape.

Above the arms C C' the rods D D' are seated in eyes in a vertically movable cross bar E to which the bars D D' are locked by set screws $e$. A crank arm F pivotally attached to frame A at $f$, and movable by means of hand lever F' serves to engage the under side of cross bar E to adjust the same vertically, and thus serves to lift the cultivator tools free from the ground, or to regulate depth to which the cultivator tools enter the ground. The cross-bar E is also provided with ears G G' to which are pivotally attached arms $g$ $g'$ which at their lower ends are provided with detachable hoes or knives H H' adapted to cut the surplus plants from the rows. The inner ends of the arms $g$ $g'$ are provided with slots $g^2$ by means of which they are attached by bolts $g^3$ to a link or connecting rod I which is adapted to be reciprocated vertically to shift the hoes H H' into and out of engagement with the plants, as indicated in dotted lines Fig. 1. The link I is adapted to be reciprocated vertically by means of a vertical rod J which is attached to link I by nuts $j$ and is supported in a bearing in the frame A at $j'$. The lower end of rod J is provided with a head J' having an eye $J^2$ in which engages the end of a lever K. The lever K is pivotally attached to the frame A at $k$, and is provided at its rear end with a pin carrying a roller $k'$ which is adapted to engage a cam groove $k^2$ in a cam K' splined to the axle B. A hand lever L is forked at its rear end and provided with pins $l$ to engage a groove $l'$ in the hub of cam K' whereby the cam K' may be shifted endwise on the axle B to engage or disengage the cam groove $k^2$ from the roller $k'$. When the cam groove and roller $k'$ are in engagement the rotation of the axle B serves to reciprocate the lever K, which through the rod J reciprocates the link I to alternately shift the hoes H H' into and out of the plant rows. The cross bar E is provided with projections $m$ adapted to engage the under side of the link I to limit its downward movement.

I preferably arrange the hoes H H' to act upon the plants of adjoining rows and the cultivators to act upon opposite sides of one row of plants as indicated in Figs. 1 and 3, but other adjustments may be provided, as for instance to provide for cultivation with one horse instead of two.

In operation the cultivator tools and hoes are adjusted to position, the pilot wheel adjusted to support the frame at the desired height to secure the desired depth of cut of the tools with the cross bar E resting upon the cross bars C C', the cam K' is shifted into engagement with the roller k' whereupon the cultivator tools will act between the plant rows N N' and the tools H H' will reciprocate alternately into and out of the respective plant rows to cut out the surplus plants. The operation of the lever F to raised position, as indicated in Fig. 3 will lift the cross bar E carrying with it the cultivator tools and tools H H' and the cam K' being first disconnected, the tools H H' will cease to reciprocate.

The mechanism herein illustrated and described is capable of considerable modification without departing from the principle of my invention.

Having described my invention, what I claim is:

1. In a mechanism of the character described, a vehicle frame provided with a cross-bar, a rotary axle provided with wheels and adapted to support said frame, a vertically adjustable yoke, mechanism to adjust and lock said yoke, cultivator tool posts armed at their lower ends with cultivator tools, said posts being connected to opposite ends of said yoke and adjustable endwise in bearings carried by the cross-bar of said frame, substantially horizontally movable tools pivotally attached to opposite ends of said yoke and adapted to alternately move into and out of the plant row to destroy a portion of the plants in the row, and mechanism controlled by the operator and actuated by the movements of said axle to reciprocate said horizontally movable tools.

2. In a mechanism of the character described, a vehicle frame, a rotary axle provided with wheels and adapted to support said frame, a vertically adjustable yoke armed at its lower free ends with cultivator tools and carried by said frame, lever mechanism to adjust and lock said yoke to position, substantially horizontally movable tools adapted to alternately move into and out of the plant row to destroy a portion of the plants in the row, said horizontally movable tools being pivotally attached to opposite ends of said yoke and vertically adjustable in unison with said cultivator tools, and mechanism controllable by the operator and actuated by the movements of said rotary axle to reciprocate said horizontally movable tools.

3. In a mechanism of the character described, a vehicle frame supported upon wheels, a rotary axle, a yoke member movable vertically relative to said frame, mechanism to adjust said member vertically, cultivator tools carried by said yoke member, bell-crank levers pivotally connected to opposite ends of said yoke member and armed at their depending ends with tools adapted to destroy a portion of the plants in the plant row, a cross-bar connected at opposite ends to the horizontal arms of said bell-crank levers, and a lever actuated by the movement of said vehicle axle to reciprocate said cross-bar and bell-crank levers.

4. In a mechanism of the character described, a vehicle frame, a rotary axle provided with wheels and adapted to support said frame, a vertically adjustable cross-bar carried by said frame, mechanism to adjust said cross-bar vertically, cultivator tools carried by said cross-bar, arms pivotally connected to said cross-bar and armed with tools adapted to cut off a portion of the plants in the plant row, a cam carried by said rotary axle, a lever adapted to be reciprocated by said cam, means to engage and disengage said cam and lever, and mechanism controlled by the movements of said lever to reciprocate said pivotally connected arms.

5. In a mechanism of the character described, a vehicle frame, a rotary axle provided with wheels and adapted to support said frame, a yoke member movable vertically relative to said frame, mechanism to adjust said member vertically, cultivator tools carried by said yoke member, bell-crank levers pivotally connected to opposite ends of said yoke member and armed at their depending ends with tools adapted to destroy a portion of the plants in the plant row, a cross-bar connected at opposite ends to the horizontal arms of said bell-crank levers, and limited as to its downward movement by stop members carried by said yoke, and a lever actuated by the movement of said vehicle axle to reciprocate said cross-bar and bell-crank levers.

In testimony whereof I affix my signature in presence of two witnesses.

JAMES L. ERWIN.

Witnesses:
R. R. KING,
N. M. COVELS.

Copies of this patent may be obtained for five cents each, by addressing the "Commissioner of Patents, Washington, D. C."